US009722817B2

(12) United States Patent
Raddadi et al.

(10) Patent No.: US 9,722,817 B2
(45) Date of Patent: Aug. 1, 2017

(54) EQUALIZATION METHOD FOR A PARSIMONIOUS COMMUNICATION CHANNEL AND DEVICE IMPLEMENTING THE METHOD

(71) Applicants: THALES, Courbevoie (FR); INSTITUT NATIONAL POLYTECHNIQUE DE TOULOUSE, Toulouse (FR); CENTRE NATIONAL DE LA RECHERCHE SCIENTIFIQUE, Paris (FR)

(72) Inventors: Bilel Raddadi, Toulouse (FR); Benjamin Gadat, Toulouse (FR); Charly Poulliat, Toulouse (FR); Nathalie Thomas, Saint Genies Bellevue (FR); Marie-Laure Boucheret, Goyrans (FR)

(73) Assignees: Thales, Courbevoie (FR); Institut National Polytechnique de Toulouse, Toulouse (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 15/017,226

(22) Filed: Feb. 5, 2016

(65) Prior Publication Data
US 2016/0234044 A1     Aug. 11, 2016

(30) Foreign Application Priority Data
Feb. 6, 2015   (FR) ........................... 15 00232

(51) Int. Cl.
*H03H 7/30*   (2006.01)
*H04L 25/03*  (2006.01)

(52) U.S. Cl.
CPC .. *H04L 25/03019* (2013.01); *H04L 25/03171* (2013.01); *H04L 25/03216* (2013.01); *H04L 2025/03414* (2013.01)

(58) Field of Classification Search
CPC ..... H04L 2025/03414; H04L 25/03019; H04L 25/03171; H04L 27/2647;
(Continued)

(56) References Cited

U.S. PATENT DOCUMENTS

| 6,904,085 B1 | 6/2005 | Citta et al. | |
| 2006/0088113 A1* | 4/2006 | Schenk | H04B 15/00 375/260 |

(Continued)

OTHER PUBLICATIONS

F. Lee et al., "Parallel-Trellis Turbo Equlizers for Sparse-Coded Transmission over SISO and MIMO Sparse Multipath Channels," IEEE Transactions on Wireless Communications, vol. 5, No. 12, Dec. 2006, pp. 3568-3578.

(Continued)

*Primary Examiner* — Leila Malek
(74) *Attorney, Agent, or Firm* — Baker Hostetler LLP (57) ABSTRACT

A method for equalizing a signal comprising modulated symbols comprising a block of N received symbols comprises: demultiplexing the N received symbols by factor L to generate a predetermined number L of sub-blocks of symbols, each comprising a version of the N received symbols sub-sampled by factor L, the independent equalization of each sub-block using an identical equalization algorithm, multiplexing the equalized symbols of each sub-block to obtain a block of N equalized symbols, removing instances of interference linked to paths other than two paths of higher power comprising generating an interference term resulting from the influence, on the equalized symbols, of all paths of the channel having the impulse response of the transmission channel except two paths of higher power, subtracting the
(Continued)

interference term from the symbols of the block of N received symbols, and, a second equalization step equal to a second iteration of the first equalization step.

14 Claims, 4 Drawing Sheets

(58) Field of Classification Search
CPC .......... H04L 2025/03611; H04B 15/00; H04B 1/123; H04B 1/7103; H04B 2201/709709; H04B 7/0854
USPC ........ 375/232, 340, 346, 316, 350; 708/320, 708/323
See application file for complete search history.

(56) References Cited

U.S. PATENT DOCUMENTS

| | | | |
|---|---|---|---|
| 2007/0104265 A1* | 5/2007 | Lin | H03H 21/0012 375/233 |
| 2008/0101451 A1* | 5/2008 | Wang | H04L 5/0007 375/232 |
| 2010/0027608 A1* | 2/2010 | Priotti | H04L 25/03866 375/232 |

OTHER PUBLICATIONS

N. Benvenuto et al., "The viterbi algorithm for sparse channels," IEEE Transactions on Communications, vol. 44, No. 3, pp. 287-289, Mar. 1996.

N. McGinty et al., "Parallel trellis viterbi algorithm for sparse channels," Communications Letters, IEEE, vol. 2, No. 5, pp. 143-145, May 1998.

J. Mietzner et al., "Equalization of Sparse Intersymbol-Interterence Channels Revisited," EURASIP Journal on Wireless communications and Networking, vol. 2006, pp. 1-13, 2006.

J. Mietzner et al., "Trellis-based equalization for sparse ISI channels revisited," Proceedings International Symposium on Information Theory, 2005, pp. 229-233.

F. Lee et al., "Iterative parallel-trellis MAP equalizers with nonuniformly-spaced prefilters for sparse multipath channels," Proceedings IEEE 56th Vehicular Technology Conference, vol. 4, pp. 2201-2205, 2002.

J. Park et al., "Turbo equalizations for sparse channels," In Wireless Communications and Networking Conference, 2004, IEEE, vol. 4, Mar. 2004, pp. 2301-2306.

J. Park et al., "Sparse map equalizers for turbo equalizations," IEEE 61st Conference in Vehicular Technology, 2005. vol. 2, May 2005, pp. 762-766.

L.Bahl et al., "Optimal Decoding of Linear Codes for minimizing symbol error rate," IEEE Transactions on Information Theory, vol. IT-20(2), pp. 284-287, Mar. 1974.

* cited by examiner

EQUALIZATION METHOD FOR A PARSIMONIOUS COMMUNICATION CHANNEL AND DEVICE IMPLEMENTING THE METHOD

CROSS-REFERENCE TO RELATED APPLICATION

This application claims priority to foreign French patent application No. FR 1500232, filed on Feb. 6, 2015, the disclosure of which is incorporated by reference in its entirety.

FIELD OF THE INVENTION

The field of the invention is that of wireless digital communications and, more specifically, communications through a so-called parsimonious transmission channel, by which is meant a channel that can principally be modelled by two paths delayed by multiple symbols and having different powers. Such a model can be applied, in particular, to an aeronautical communication link, for example a downlink between a satellite and an aircraft.

The invention more specifically pertains to an equalization method and device of low implementational complexity, which is particularly suited to a parsimonious transmission channel.

BACKGROUND

The equalization of the received signal is an important task for a signal receiver, especially when the propagation channel is disrupted by the presence of multiple paths.

Numerous equalization algorithms exist in the literature, but a general drawback of these solutions is that they most often generate a considerable amount of implementational complexity, all the more so as the desired performance levels for demodulation and decryption during reception are high.

The equalization techniques applied to parsimonious transmission channels have been addressed in various publications. References [1]-[4] are cited by way of example. The described methods are most often based on the implementation of a detection algorithm based on multiple parallel trellises, of Viterbi algorithm or MAP (Maximum A Posteriori) algorithm type. These algorithms have the drawback of considerable implementational complexity.

On the other hand, certain methods (described, for example, in references [2], and [5]) impose a channel model in which the secondary paths are of zero power, which amounts to an approximation that is not always realistic.

For non-approximated channel models, the known equalization methods implement a function for removing interference that requires an interdependence between the parallel trellises, which may entail increased implementational complexity. Such methods are described in particular in references [5]-[8]. These methods have the additional drawback that they do not allow parallelization and total independence of the processing operations that are executed on the different trellises as a result of their interdependence.

The present invention aims to overcome the drawbacks of the equalization methods that are known from the prior art by proposing an equalization method suited to a parsimonious channel that makes a high degree of parallelization possible in the implemented processing operations.

SUMMARY OF THE INVENTION

A subject of the invention is thus, in a first embodiment, a method for equalizing a signal comprising a plurality of modulated symbols, said signal being transmitted by a sender, through a transmission channel, to a receiver, said method comprising the following steps that are applied to a block of N received symbols:
  a first step of equalizing said block comprising:
    i. the demultiplexing of the N received symbols by a factor L so as to generate a predetermined number L of sub-blocks of symbols, each comprising a version of said block of N received symbols that is sub-sampled by a factor L,
    ii. the independent equalization of each sub-block using an identical equalization algorithm,
    iii. the multiplexing of the equalized symbols of each sub-block in order to obtain a block of N equalized symbols,
  a step of removing instances of interference that are linked to paths other than the two paths of higher power comprising:
    i. the generation of an interference term resulting from the influence, on said equalized symbols, of all of the paths of the channel having the impulse response of the transmission channel except the two paths of higher power,
    ii. the subtraction of said interference term from the symbols of the block of N received symbols,
  a second equalization step equal to a second iteration of the first equalization step.

According to a particular aspect of the first embodiment of the invention, the step of removing instances of interference and the second equalization step are executed iteratively.

According to a particular aspect of the first embodiment of the invention, said equalization algorithm is configured to operate on a trellis, each state of the trellis representing a possible symbol, each branch between two consecutive states of the trellis being associated with a received modulated symbol.

According to a particular aspect of the first embodiment of the invention, said equalization algorithm operating on a trellis comprises a first step of traversing the trellis in the forward direction, in which step a first probability of occurrence of said state, knowing the possible symbols that are associated with the prior states up to the section preceding the current state, is calculated for each section of the trellis and for each current state of the section, a block of equalized symbols being determined as the sequence of states in the trellis which makes it possible to maximize said first probabilities.

According to a particular aspect of the first embodiment of the invention, said equalization algorithm operating on a trellis comprises a second step of traversing the trellis in the backward direction, in which step a second probability of occurrence of a sequence of possible symbols that are associated with the sections that are subsequent to said section, knowing the current state, is calculated for each section of the trellis and for each current state of the section, a block of equalized symbols being determined as the sequence of states in the trellis which makes it possible to maximize the products between said first probability and said second probability.

Another subject of the invention, in a second embodiment, is a method for equalizing a signal comprising a plurality of modulated symbols, said signal being transmitted by a sender, through a transmission channel, to a receiver, said method comprising the following steps that are applied to a block of N received symbols:

a first step of equalizing said block comprising:
  i. the demultiplexing of the N received symbols by a factor L so as to generate a predetermined number L of sub-blocks of symbols, each comprising a version of said block of N received symbols that is sub-sampled by a factor L,
  ii. the independent equalization of each sub-block using an equalization algorithm operating on a trellis, each state of the trellis representing a possible symbol, each branch between two consecutive states of the trellis being associated with a received modulated symbol, said equalization algorithm comprising a step of traversing the trellis in the forward direction, in which step a first probability of occurrence of said state, knowing the possible symbols that are associated with the prior states up to the section preceding the current state, is calculated for each section of the trellis and for each current state of the section, a block of equalized symbols being determined as the sequence of states in the trellis which makes it possible to maximize said first probabilities,
  iii. the multiplexing of the equalized symbols of each sub-block in order to obtain a block of N equalized symbols,
a step of removing instances of interference that are linked to paths other than the two paths of higher power comprising:
  i. the generation of an interference term resulting from the influence, on said equalized symbols, of all of the paths of the channel having the impulse response of the transmission channel except the two paths of higher power,
  ii. the subtraction of said interference term from the symbols of the block of N received symbols,
a second equalization step comprising:
  i. the demultiplexing of the block of N symbols by a factor L so as to generate a predetermined number L of sub-blocks of symbols, each comprising a version of said block that is sub-sampled by a factor L,
  ii. the independent equalization of each sub-block using an equalization algorithm operating on a trellis, each state of the trellis representing a possible symbol, each branch between two consecutive states of the trellis being associated with a received modulated symbol, said equalization algorithm comprising a step of traversing the trellis in the backward direction, in which step a second probability of occurrence of a sequence of possible symbols that are associated with the sections that are subsequent to said section, knowing the current state, is calculated for each section of the trellis and for each current state of the section, a block of equalized symbols being determined as the sequence of states in the trellis which makes it possible to maximize the products between said first probability and said second probability,
  iii. the multiplexing of the equalized symbols of each sub-block in order to obtain a block of N equalized symbols.

According to a particular aspect of the second embodiment, the method according to the invention furthermore comprises at least one iteration of the successive execution of the step of removing instances of interference and of the first equalization step.

According to a particular aspect of the second embodiment, the method according to the invention furthermore comprises at least one iteration of the successive execution of a first occurrence of the step of removing instances of interference, of the first equalization step, of a second occurrence of the step of removing instances of interference and of the second equalization step.

According to a particular aspect of the invention, said equalization algorithm is an MAP algorithm, for example a BCJR (Bahl, Cocke, Jelinek, Raviv) algorithm.

According to a particular aspect of the invention, the demultiplexing factor L is equal to the duration, expressed as a whole number of symbols, between the two paths of higher power in the impulse response of the transmission channel.

According to a particular aspect of the invention, the generation of the interference term is carried out by the convolution of the block of N equalized symbols with an estimate of the impulse response of the transmission channel, in which the coefficients corresponding to the two paths of higher power are set to zero.

Yet another subject of the invention is a computer program, comprising instructions for the execution of the method for equalizing a received signal according to the invention when the program is executed by a processor, a recording medium that is readable by a processor, on which a program comprising instructions for the execution of the method for equalizing a received signal according to the invention when the program is executed by a processor has been recorded, a device for equalizing a received signal, comprising means configured for executing the method for equalizing a received signal according to the invention, and a signal receiver, comprising a device for equalizing the received signal according to the invention.

BRIEF DESCRIPTION OF THE DRAWINGS

Other features and advantages of the present invention will become more apparent upon reading the following description, which makes reference to the appended drawings, in which.

DETAILED DESCRIPTION

The invention pertains to a method for equalizing a signal that is received by a receiver and an equalization device suitable for executing the method. The signal is transmitted by a sender through a propagation channel subjected to the influence of multiple paths that are linked to the reflections of the signal on different elements of the transmission environment. The signal is modulated with the aid of a given modulation diagram. The signal that is received by the receiver is sampled and processed in order to provide symbols at the pace of the modulator. The sampled symbols must then be equalized in order to remove the instances of interference that are linked to the imperfect response of the transmission channel.

Figure 1:
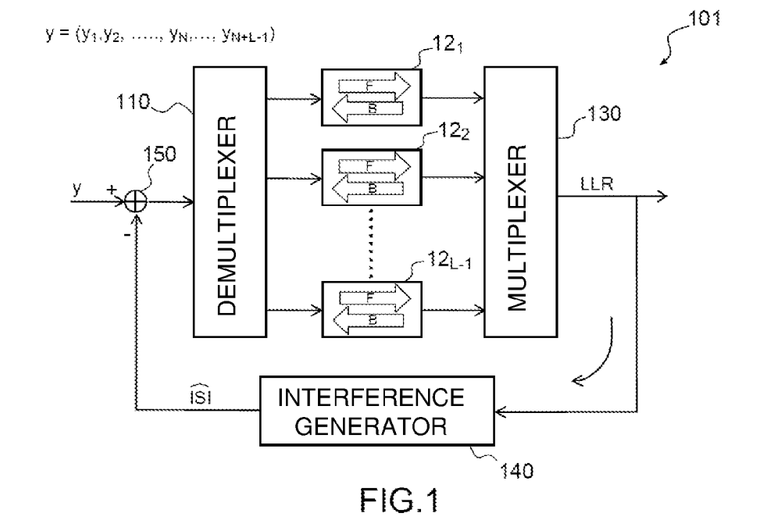
FIG. 1 shows an overview of an equalizer according to the invention in a first embodiment.

FIG. 1 shows an overview of an equalizer according to a first embodiment of the invention.

The invention is based on the hypothesis that the transmission channel between the sender and the receiver can be modelled by two remote high-power paths of a duration that is equivalent to a number L of modulated symbols. The other paths are considered to have a low power in relation to the two dominant paths.

This model is particularly, but not solely, suited to the representation of an aeronautical propagation channel connecting a satellite to an aircraft. In this scenario, the path of highest power corresponds to the direct path between the satellite and the aircraft while the second path, of power that is high but lower than that of the main path, corresponds to the reflection of the signal on the surface of the earth.

Figure 2:
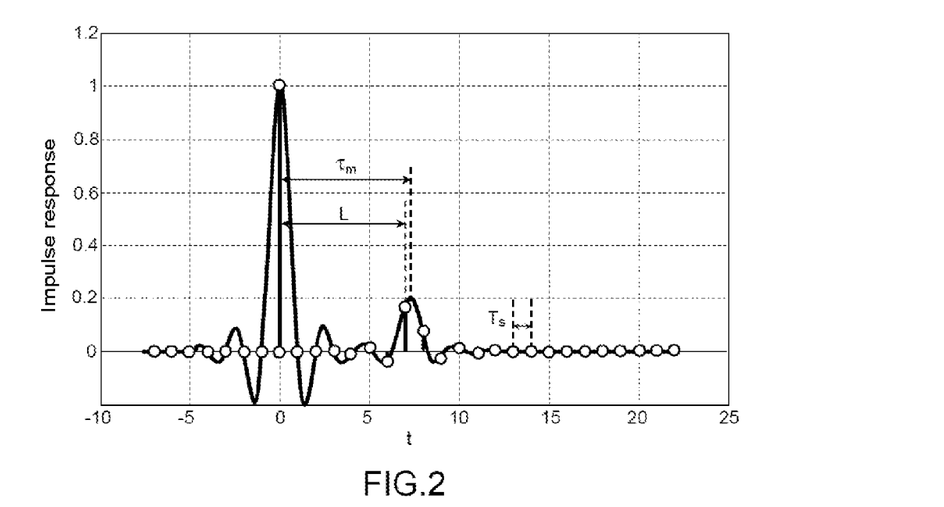
FIG. 2 shows a graph illustrating a hypothetical impulse response of the propagation channel.

FIG. 2 shows, in a timing diagram, an example of the appearance of the impulse response of a transmission channel with two main paths. The two paths are spaced apart by a time period $\delta_m$ that is equivalent to a number L of symbols, a symbol having a duration Ts.

The relationship (1) represents a sequence of N received symbols $y_i$ as a function of the N sent symbols $x_i$ and the parameters of the channel. $L_{channel}$ is the total length of the impulse response of the channel.

$$(y_1 y_2 \ldots y_{N-1} y_N) = \mathrm{conv}([x_1 x_2 \ldots x_{N-1} x_N], \\ [h_1 h_2, \ldots h_{L-1}, h_L, \ldots h_{Lchannel}]) + B \quad (1)$$

It can be seen that a sequence of received symbols can be expressed as the sum of two terms.

The first term is the product of convolution between the sequence of symbols that are sent with the impulse response of the channel of length $L_{channel}$. The second term B represents the thermal noise that is added to the signal being received.

Traditionally, the equalization of the received symbols can be carried out by an MAP (Maximum A Posteriori) equalizer, which aims to calculate, for each symbol of the received sequence, the a posteriori probability of the associated symbol, knowing the sequence of received symbols.

This type of equalization algorithm is based on the use of a trellis whose states correspond to the memory of the channel, in other words to the last $L_{Lchannel}-1$ symbols received. The number of states of the trellis is therefore equal to $M^{L_{channel}-1}$, where M is the order of the modulation. It is therefore clearly apparent that a drawback resides in the implementational complexity of such an algorithm when the length of the estimated channel $L_{channel}$ is great.

In order to propose a solution to this problem, the invention proposes a different representation of the received signal, which is given by the relationship (2).

$$(y_1 y_2 \ldots y_{N-1} y_N) = \mathrm{conv}([x_1 x_2 \ldots x_{N-1} x_N], [h_1, 0, \ldots \\ 0, h_L, 0 \ldots 0]) + ISI + B \quad (2)$$

This time the received signal is broken down into a sum of three terms.

The first term is the product of convolution between the sequence of symbols that are sent with the impulse response of the channel, in which only the two paths having the highest amplitude $h_1$, $h_L$ are kept while the other paths are forced to 0. The response of the channel is thus represented by the vector $[h_1, 0, \ldots 0, h_L, 0 \ldots 0]$ of length $L_{channel}$.

The second term ISI represents a term for symbol interference resulting from the convolution of the symbols that are sent with the impulse response of the channel, this time comprising solely the paths having low amplitude, while the two paths having greater amplitudes are set to zero. This second term can be expressed in the form $$ISI = \mathrm{conv}([x_1 x_2 \ldots x_{N-1} x_N], [0, h_2, \ldots h_{L-1}, 0, \\ h_{L+1}, \ldots h_{Lchannel}])$$

Lastly, the third term B represents the thermal noise that is added to the signal being received.

By using the representation given by the relationship (2), it can be seen that the first term corresponds to the signal that is affected by the interference generated by a parsimonious channel with two unique paths. Such a channel can be reduced, in an equivalent manner, to multiple independent channels comprising two successive paths. Specifically, by demultiplexing the signal that is received on L parallel reception routes, each route sub-sampled by a factor L, the signal on each of these routes is affected by a channel of length equal to two, in other words a channel with two successive paths. The equalization of each of its sub-sampled routes by an MAP equalizer is then less complex to implement as the memory of the equalizer is no longer equal to $L_{channel}$, but equal to two.

The second term ISI for interference that is linked to the paths having secondary amplitude on the channel is considered to have little influence on the decisions on the equalization structure that is parallelized on L routes. Thus, the invention proposes removal of the interference that is linked to this second term by regenerating it at the output of the equalization block, then subtracting it from the received signal and iterating the process.

FIG. 1 thus shows the overall structure of the equalizer that is proposed according to the invention. The equalizer according to the invention is shown in the form of a block diagram corresponding to modules that are implemented by an overall device. Each module may equally also be understood to be a step of the equalization method according to the invention.

The device 101 thus comprises a demultiplexer 110 having a factor L equal to the distance, in number of symbols, between the two paths having higher amplitudes in the impulse response of the channel. The demultiplexer 110 receives a block of N received symbols and produces, at the output, L parallel routes comprising the same symbols divided into L sub-sampled sub-blocks.

On each demultiplexing route, an equalizer $12_1$, $12_2$, ... $12_{L-1}$, of MAP equalizer type, is applied.

Without departing from the scope of the invention, the MAP-type equalizer can be replaced by a linear equalizer, for example an equalizer of DFE (Decision Feedback Equalizer) or MMSE (Minimum Mean Square Error) or ZF (Zero Forcing) type.

In the rest of the text, the invention is described within the framework of an application employing an MAP-type equalizer.

A multiplexer 130 reconstructs a block of N equalized symbols from the outputs of the L equalizers. The equalized symbols may be soft-value or LLR (log likelihood ratio) symbols or binary values.

An interference generator 140 takes the block of equalized symbols at the input and produces an estimate of the second term ISI of the relationship (2) at the output. For this, the interference generator 140 carries out a convolution operation between the sequence of equalized symbols and the impulse response, of the channel, in which the coefficients corresponding to the two paths having higher powers are set to zero.

$$\widehat{ISI} = \mathrm{conv}([\hat{x}_1 \widehat{x_2} \ldots \hat{x}_{N-1} \hat{x}_N], [0, h_2, \ldots h_{L-1}, 0, \\ h_{L+1}, \ldots h_{Lchannel}])$$

The coefficients of the impulse response of the channel can be obtained using a channel estimation algorithm for which a person skilled in the art knows at least one implementation among the known techniques of the prior art. Such a method is not elaborated upon here.

The interference term is next subtracted 150 from the received symbols in order to perform a second iteration of the processing operations described above.

Multiple successive iterations may be carried out in order to converge towards an optimum sequence of symbols, for the two-path channel model, in which the interference that is linked to the second term ISI is removed completely.

An advantage of the structure of the equalizer 101 according to the invention is that it makes a high level of parallelization possible, as, on each output route of the demultiplexer 110, L identical equalizers can be simultaneously executed in parallel, since there is no interdependence between these equalizers.

An MAP equalizer is based on the search, for a sequence of received symbols, for the sent sequence corresponding to the symbols having the highest a posteriori probability. In order to determine this sequence, the MAP equalizer uses a "forward-backward" algorithm which is based on a trellis whose states correspond to the memory of the channel, in other words to the last $L_{channel}-1$ symbols received, and each branch between two states of the trellis corresponds to a new received symbol. The implemented trellis has a number N of sections equal to the number N of symbols per block that is processed at the input of the equalizer according to the invention.

The "forward-backward" algorithm implements a traverse through the trellis in two steps. A first step consists of traversing the trellis in the forward direction and of calculating, over the course of the traverse and for each state of the trellis, a first probability of being in a given state, knowing all of the observations up to the preceding section of trellis. An observation signifies a received symbol.

A second step consists of traversing the trellis in the backward direction and of calculating, for each state of the trellis, a second probability of obtaining the sequence of observations in the subsequent sections of the trellis, knowing the state in question.

This algorithm is well known to a person skilled in the art, one who is specialized in signal processing applied to channel equalization, and is not described in detail here. The reader may, for example, refer to article [9].

Of importance to the understanding of the invention is that the MAP equalization algorithm usually comprises a first step of traversing the trellis in the forward direction and a second step of traversing the trellis in the backward direction.

Furthermore, the demultiplexing of the signal that is received on L parallel sub-sampled routes makes it possible to get down, on each route, to an equivalent signal that is affected by a transmission channel whose memory has a value of 1 rather than $L_{channel}-1$.

This observation makes it possible to simplify the implementation of the MAP equalization algorithm. Indeed, the number of states of the trellis is equal to $M^{L_{channel}-1}$, where M is the order of the modulation. By getting down to a channel having memory equal to 1 on each equalization route, it is possible to apply an equalizer employing a trellis comprising only M states ($L_{Lchannel}=2$). This simplification makes it possible to reduce the implementational complexity.

Figure 3:
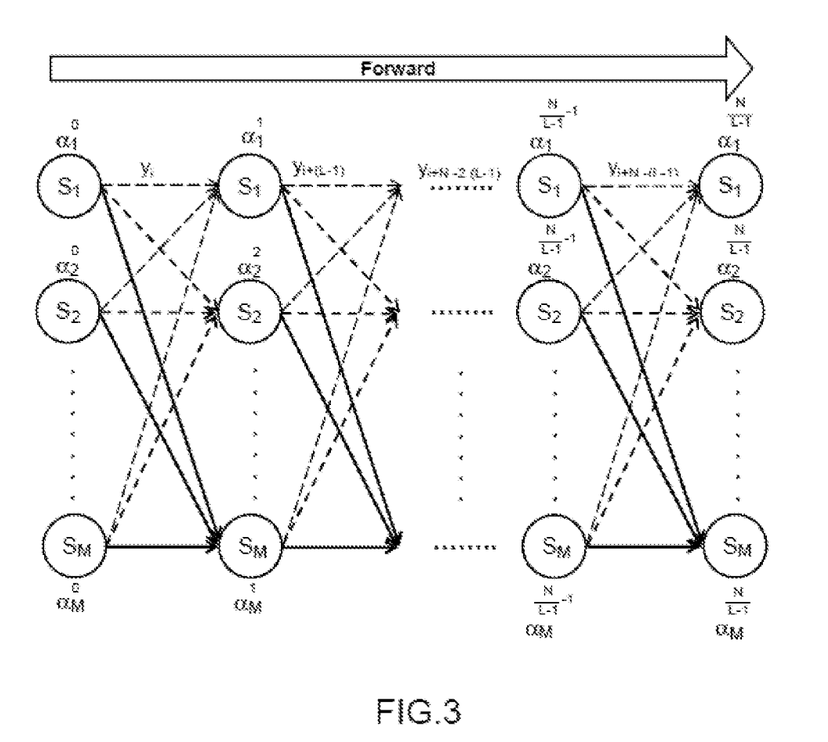
FIG. 3 shows a diagram illustrating a traverse in the forward direction through a trellis at the time of the implementation of an equalization algorithm of BCJR type.

FIG. 3 illustrates an exemplary traverse through a trellis in the forward direction, which corresponds to the "forward" step of the "forward-backward" algorithm. For each section of the trellis, and for each state of a section, a first probability $\alpha_j^k$ of being in a given state, knowing the past observations, is calculated.

By way of non-limiting example, this probability $\alpha_j^k$ can be calculated using the following algorithm. Any known variant for the implementation of this algorithm may also be considered, while remaining within the limits of the general knowledge of a person skilled in the art.

The first values of the probabilities are initially set to $\alpha_1^0=1$ $\alpha_{j\neq 1}^0=0$.

The subsequent values are calculated iteratively by the following algorithm $$\text{For k varying from 1 to } \frac{N}{L-1}$$

$$\text{For j from 1 to M}$$

$$\alpha_j^k = \sum_j \gamma^i(S', S)\alpha_j^{k-1}$$

$$\text{End}$$
$$\text{end}$$

N is the number of symbols of the received block of symbols to which the equalizer is applied.

$\gamma^k(S', S) = p(S, y_k/S') = p(S/S') p(y_k/S, S') = p(s_k=S) p(y_k/S, S')$, where S' is a current state and S a future state, yk being a received symbol.

$p(s_k=S)$ is a probability that is determined from the a priori of the bits corresponding to the symbol $s_k$.

$p(y_k/S, S')$ can be determined using the following relationship:

$$p(y_k/S, S') = \frac{1}{\sigma\sqrt{2\pi}} e^{-\frac{|y_k - \hat{ISI} - (\hat{h}_2 S' + \hat{h}_1 S)|^2}{2\sigma^2}}$$

Figure 4:
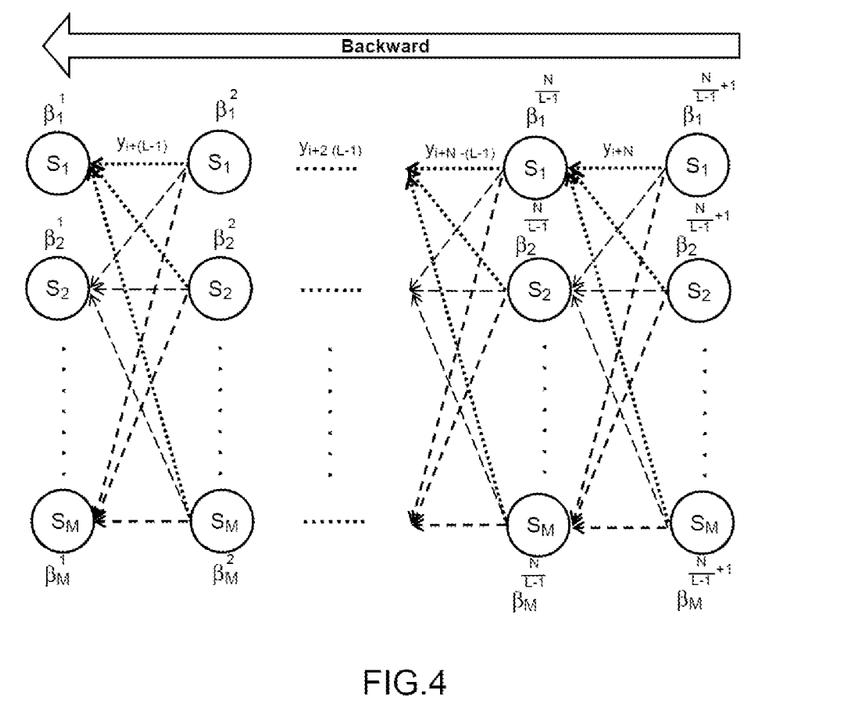
FIG. 4 shows a diagram illustrating a traverse in the backward direction through a trellis at the time of the implementation of an equalization algorithm of BCJR type.

FIG. 4 describes an exemplary traverse through a trellis in the backward direction, which corresponds to the "backward" step of the "forward-backward" algorithm. For each section of the trellis, and for each state of a section, a second probability $\beta_j^k$ of obtaining the sequence of symbols received in the future, knowing the current state, is calculated.

An exemplary algorithm making it possible to calculate the second probabilities $\beta_j^k$ is given below.

The first values of the probabilities $$\beta_1^{\frac{N}{L-1}+1} \text{ and } \beta_{j\neq 1}^{\frac{N}{L-1}+1}$$

are initially set to values that are dependent on the strategy for implementing closure of the trellis.

The subsequent values are calculated iteratively by the following algorithm $$\text{For k varying from } \frac{N}{L-1} \text{ to 1}$$

$$\text{For j from 1 to M}$$
$$\beta_j^k = \Sigma_j \gamma^i(S', S) \beta_j^{k+1}$$
$$\text{end}$$
$$\text{end}$$

The probability of being in a given state at a given instant can be expressed using the following relationship:
$p(S,y) = \Sigma_s' p(S', S, y) = \Sigma_s' \alpha^{k-1}(S') \gamma^k(S', S) \beta^k(S)$.

But for a channel having memory of length equal to 1, this relationship is simplified to arrive at the following final relationship:

$$p(s_k = S_{j},y) = \alpha_j^k \beta_j^k \quad \begin{matrix} j \in [1 \ldots M] \\ k \in [1 \ldots M] \end{matrix} \quad (3)$$

In order to obtain the final sequence of equalized symbols, the sequence of maximum probabilities $p(s_k=S_j,y)$ is sought out in the trellis as a whole. The equalized symbols that are kept are those that correspond to the maximum probabilities for each section of the trellis. By operating in this manner, the symbol error rate on the block of equalized symbols is minimized.

In a variant of the first embodiment of the invention that is described in FIG. 1, it is possible to limit the implementational complexity further by simplifying the MAP algorithm by executing solely the "forward" step. In this case the relationship (3) is changed to (4)

$$p(s_k = S_{j},y) = \alpha_j^k \quad \begin{matrix} j \in [1 \ldots M] \\ k \in [1 \ldots M] \end{matrix} \quad (4)$$

According to this variant, the equalizers $12_1$, $12_2$, ... $12_{L-1}$ implement solely a "forward" step rather than a "forward" step followed by a "backward" step.

Figure 5:
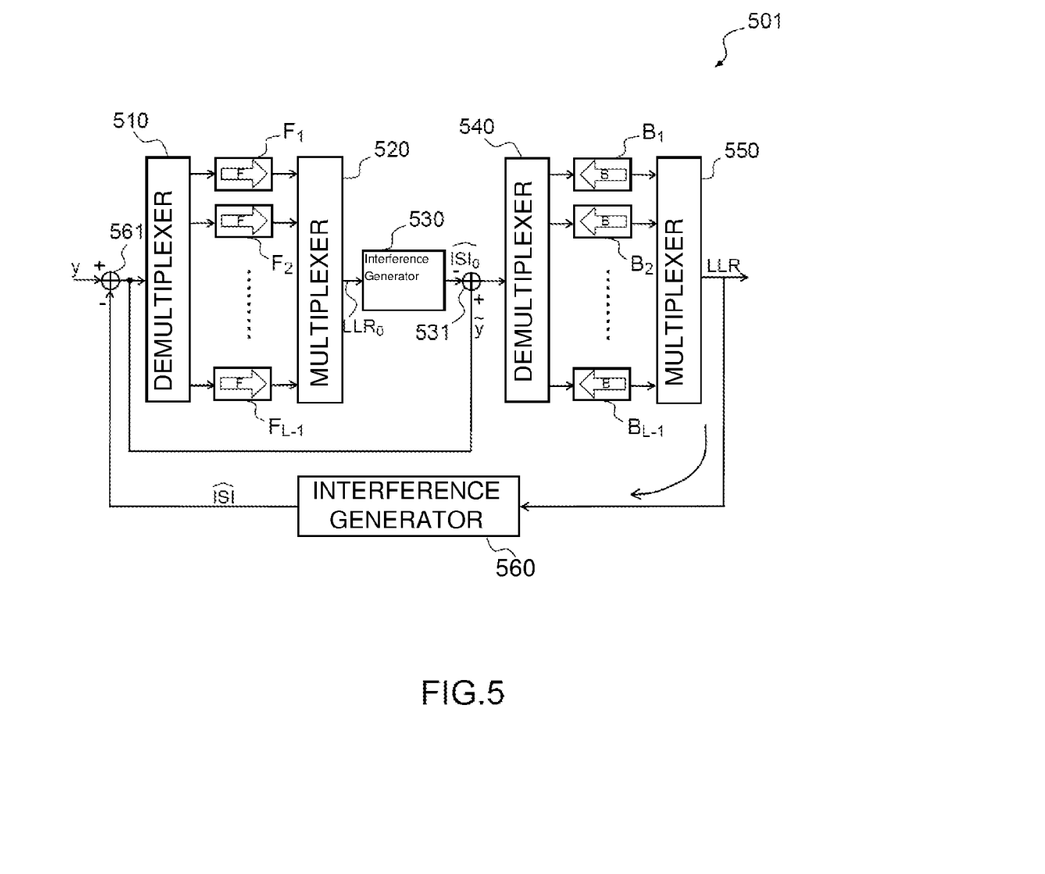
FIG. 5 shows an overview of an equalizer according to the invention in a second embodiment.

FIG. 5 diagrammatically illustrates a second embodiment of an equalization device 501 according to the invention.

In this second embodiment, an additional step of removing interference 530 is introduced between the "forward" step of the equalization and the "backward" step.

The device 501 comprises a first demultiplexer 510 that is identical to the demultiplexer 110 of the device of FIG. 1, which produces, at the output, L parallel routes comprising the same symbols divided into L sub-sampled sub-blocks.

On each demultiplexing route, a first equalizer $F_1$, $F_2$, ... $F_{L-1}$ of MAP equalizer type is applied, but implementing solely the step of traversing the trellis in the forward direction, or the "forward" step.

A first multiplexer 520 that is identical to the multiplexer 130 of FIG. 1 reconstructs a block of N equalized symbols from the outputs of the L first equalizers $F_1$, $F_2$, ... $F_{L-1}$. The equalized symbols can be soft-value or LLR (log likelihood ratio) symbols or decided values.

A first interference generator 530 that is identical to the generator 140 of FIG. 1 takes the block of equalized symbols at the input and produces an estimate of the interference term ISI at the output. This interference term is subtracted 531 from the received symbols in order to produce equalized symbols corrected for the residual intersymbol interference linked to the secondary paths of the propagation channel.

The symbols obtained are then produced at the input of a second module comprising a second demultiplexer 540 that is identical to the first demultiplexer 510, L second equalizers $B_1$, $B_2$, ... $B_{L-1}$ and a second multiplexer 550 that is identical to the first multiplexer 520. The second equalizers $B_1$, $B_2$, ... $B_{L-1}$ implement only the step of traversing the trellis in the backward direction, or the "backward" step.

The symbols that are obtained at the output of the multiplexer 550 can be used as final equalized symbols. In this case, in the opposite manner to the system of FIG. 1, the second embodiment of the invention does not require iterations as the residual interference is managed between the "forward" steps and the "backward" steps. An advantage of this implementation is that it reduces the number of processing operations to be carried out and therefore the overall latency of the equalization operation.

According to a variant of the second embodiment of the invention, the device 501 furthermore comprises a second interference generator 560 that operates in a manner that is identical to the interference generator 140 of FIG. 1 and corrects 561 the residual interference of the input symbols of the device 501.

The system according to this variant may be iterated over multiple iterations. It may also be stopped from the first half-iteration, in other words, during the first iteration, the method may stop without executing the "backward" equalization steps $B_1$, $B_2$, ... $B_{L-1}$. In this case, the symbols corrected for the residual interference generated by the generator 530 are retained as being the final equalized symbols.

The diagrams of FIGS. 1 and 5 must be understood as describing both an equalization device composed of multiple modules (demultiplexer, multiplexer, equalizers, interference generator) and an equalization method executing multiple steps (demultiplexing, multiplexing, equalization, interference generation).

The equalization device 101, 501 according to the invention can comprise, in order to implement the demultiplexers 110, 510, 540, the multiplexers 130, 520, 550, the equalizers $12_1$, $12_2$, ... $12_{L-1}$, $F_1$, ... $F_{L-1}$, $B_1$, ... $B_{L-1}$ and the interference generators 140, 530, 560, hardware and/or software elements. In particular, it can comprise a processor and a memory. The processor may be a generic processor, a specific processor, an integrated circuit that is specific to an application (known as an ASIC for "Application-Specific Integrated Circuit") or a network of gates programmable in situ (known as FPGAs for "Field-Programmable Gate Arrays").

The device may use one or more dedicated electronic circuits or a general-purpose circuit. The technique of the invention may be carried out on a reprogrammable computing machine (a processor or a microcontroller, for example) executing a program comprising a sequence of instructions, or on a dedicated computing machine (for example a set of logic gates such as an FPGA or an ASIC, or any other hardware module).

The equalization device according to the invention is intended to be integrated in a receiver of signals transmitted by radio.

The equalization method according to the invention may be implemented as a computer program comprising instructions for its execution. The computer program may be recorded on a recording medium that is readable by a processor. The medium may be electronic, magnetic, optical or electromagnetic.

The reference to a computer program which, when it is executed, carries out any one of the previously described functions is not limited to an application program that is executed on a single host computer. On the contrary, the terms computer program and software are used here in a general sense in order to refer to any type of computer code (for example a piece of application software, a piece of firmware, a microcode, or any other form of computer instruction) which can be used to program one or more processors for implementing aspects of the techniques described here. The computing means or resources can in particular be distributed ("cloud computing"), potentially using peer-to-peer technologies. The software code may be executed on any suitable processor (for example a microprocessor), processor core or a set of processors, whether provided in a single computing device or distributed between multiple computing devices (such as those potentially accessible in the environment of the device, for example). The executable code of each program making it possible for the programmable device to implement the processes according to the invention may be stored, for example, on the hard disk or in read-only memory. In a general manner, the program or programs may be loaded into one of the storage means of the device before being executed. The central unit may control and direct the execution of the instructions or segments of software code from the program or programs according to the invention, the instructions being stored on the hard disk or in the read-only memory, or else in the other aforementioned storage elements.

REFERENCES

[1] N. Benvenuto and R. Marchesani, "The viterbi algorithm for sparse channels," Communications, IEEE Transactions on, vol. 44, no. 3, pp. 287-289, March 1996.
[2] N. McGinty, R. Kennedy, and P. Hocher, "Parallel trellis viterbi algorithm for sparse channels," Communications Letters, IEEE, vol. 2, no. 5, pp. 143-145, May 1998.
[3] F. H. Lee and P. Mclane, "Parallel-Trellis Turbo Equalizers for Sparse Coded Transmission over SISO and MIMO Sparse Multipath Channels," IEEE Transactions on Wreless Communications, vol. 5, no. 12, pp. 3568-3578, December 2006.
[4] J. Mietzner, S. Badri-Hoeher, I. Land, and P. a. Hoeher, "Equalization of Sparse Intersymbol-Interference Channels Revisited," EURASIP Journal on Wireless Communications and Networking, vol. 2006, pp. 1-13, 2006.
[5] J. Mietzner, S. Badri-Hoeher, I. Land, and P. Hoeher, "Trellis-based equalization for sparse ISI channels revisited," Proceedings. International Symposium on Information Theory, 2005. ISIT 2005, pp. 229-233, 2005.
[6] F. Lee and P. McLane, "Iterative parallel-trellis MAP equalizers with nonuniformly-spaced prefilters for sparse multipath channels," Proceedings IEEE 56th Vehicular Technology Conference, vol. 4, pp. 2201-2205, 2002.
[7] J. Park and S. Gelfand, "Turbo equalizations for sparse channels," In Wireless Communications and Networking Conference, 2004. WCNC. 2004 IEEE, vol. 4, March 2004, pp. 2301-2306 Vol. 4.
[8] "Sparse map equalizers for turbo equalizations," in Vehicular Technology Conference, 2005. VTC 2005-Spring. 2005 IEEE 61st, vol. 2, May 2005, pp. 762-766 Vol. 2.
[9] <<L. Bahl, J. Cocke, F. Jelinek, and J. Raviv, "Optimal Decoding of Linear Codes for minimizing symbol error rate", IEEE Transactions on Information Theory, vol. IT-20(2), pp. 284-287, March 1974.

The invention claimed is:

1. A method for equalizing a signal having a plurality of modulated symbols, said signal being transmitted by a sender, through a transmission channel, to a receiver, said method comprising the following steps that are applied to a block of N received symbols, N being a non-zero positive integer:
   a first equalization step for said block comprising:
      demultiplexing the N received symbols by a factor L to generate a predetermined L number of sub-blocks of symbols, each having a version of said block of N received symbols that is sub-sampled by a factor L, L being a non-zero positive integer,
      independently equalizing each sub-block of symbols using an identical equalization algorithm, and
      multiplexing the respective equalized symbols of said each sub-block to obtain a block of N equalized symbols,
   a step of removing instances of interference that are linked to paths other than two highest power paths comprising:
      generating an interference term resulting from the interference on said equalized symbols, of all paths of the transmission channel having an impulse response of the transmission channel except the two highest power paths, and
      subtracting said interference term from the symbols of the block of N received symbols, and
   a second equalization step that is equal to an at least one repetition of the first equalization step.

2. The method for equalizing a signal according to claim 1, wherein the step of removing instances of interference and the second equalization step are both executed iteratively.

3. The method for equalizing a signal according to claim 1, wherein said identical equalization algorithm is configured to operate on a trellis, each state of the trellis representing a possible symbol, each branch between two consecutive states of the trellis being associated with a received modulated symbol.

4. The method for equalizing a signal according to claim 3, wherein said identical equalization algorithm operating on said trellis includes a first step of traversing the trellis in a forward direction, wherein a first probability of occurrence of said state, knowing the possible symbols that are associated with prior states up to a section preceding a current state, is calculated for each section of the trellis and for each current state of the section, and wherein a block of equalized symbols is determined as the sequence of respective states in the trellis which maximizes respective first probabilities.

5. The method for equalizing a signal according to claim 4, wherein said identical equalization algorithm operating on a trellis includes a second step of traversing the trellis in a backward direction, wherein a second probability of occurrence of a sequence of possible symbols that are associated with sections that are subsequent to said section, knowing the current state, is calculated for each section of the trellis and for each current state of the section, and wherein a block of equalized symbols is determined as the sequence of respective states in the trellis which maximizes respective products between said first probability and said second probability.

6. The method for equalizing a signal according to claim 3, wherein said equalization algorithm is a MAP algorithm, including a Bahl, Cocke, Jelinek, Raviv (BCJR) algorithm.

7. The method for equalizing a signal according to claim 1, wherein the demultiplexing factor L is equal to a duration, expressed as a whole number of symbols, between the two highest power paths in the impulse response of the transmission channel.

8. The method for equalizing a signal according to claim 1, wherein the interference term is generated by a convolution of the block of N equalized symbols with an estimate of the impulse response of the transmission channel, wherein coefficients corresponding to the two highest power paths are set to zero.

9. A method for equalizing a signal having a plurality of modulated symbols, said signal being transmitted by a sender, through a transmission channel, to a receiver, said method comprising the following steps that are applied to a block of N received symbols, N being a non-zero positive integer:
    a first equalization step for said block comprising:
        demultiplexing the N received symbols by a factor L to generate a predetermined L number of sub-blocks of symbols, each having a version of said block of N received symbols that is sub-sampled by a factor L, L being a non-zero positive integer,
        independently equalizing each sub-block of symbols using an equalization algorithm operating on a trellis, each state of the trellis representing a possible symbol, each branch between two consecutive states of the trellis being associated with a received modulated symbol, said equalization algorithm having a step of traversing the trellis in a forward direction, in which a first probability of occurrence of said state, knowing the possible symbols that are associated with prior states up to a section preceding the current state, is calculated for each section of the trellis and for each current state of the section, such that a block of equalized symbols is determined as the sequence of respective states in the trellis which maximizes respective first probabilities, and
        multiplexing the respective equalized symbols of said each sub-block in order to obtain a block of N equalized symbols,
    a step of removing instances of interference that are linked to paths other than two highest power paths comprising:
        generating an interference term resulting from the interference, on said equalized symbols, of all paths of the transmission channel having an impulse response of the transmission channel except the two highest power paths, and
        subtracting said interference term from the symbols of the block of N received symbols, and
    a second equalization step comprising:
        demultiplexing the block of N symbols by a factor L to generate a predetermined L number of sub-blocks of symbols, each having a version of said block that is sub-sampled by a factor L,
        independently equalizing each sub-block using an equalization algorithm operating on a trellis, each state of the trellis representing a possible symbol, each branch between two consecutive states of the trellis being associated with a received modulated symbol, said equalization algorithm including a step of traversing the trellis in a backward direction, in which a second probability of occurrence of a sequence of possible symbols that are associated with sections that are subsequent to said section, knowing the current state, is calculated for each section of the trellis and for each current state of the section, and wherein a block of equalized symbols is determined as the sequence of respective states in the trellis which maximizes respective products between said first probability and said second probability, and
        multiplexing the equalized symbols of each sub-block to obtain a block of N equalized symbols.

10. The method for equalizing a signal according to claim 9, further comprising at least one iteration of a successive execution of the step of removing instances of interference and of the first equalization step.

11. The method for equalizing a signal according to claim 9, further comprising at least one iteration of a successive execution of a first occurrence of the step of removing instances of interference, of the first equalization step, of a second occurrence of the step of removing instances of interference and of the second equalization step.

12. A non-transitory computer readable medium having a computer program stored thereupon, said computer program comprising instructions for execution by a processor of a method for equalizing a signal comprising a plurality of modulated symbols, said signal being transmitted by a sender, through a transmission channel, to a receiver, said method comprising the following steps that are applied to a block of N received symbols, N being a non-zero positive integer:
    a first equalization step for said block comprising:
        demultiplexing the N received symbols by a factor L to generate a predetermined L number of sub-blocks of symbols, each having a version of said block of N received symbols that is sub-sampled by a factor L, L being a non-zero integer,
        independently equalizing each sub-block of symbols using an identical equalization algorithm, and
        multiplexing the respective equalized symbols of said each sub-block to obtain a block of N equalized symbols,
    a step of removing instances of interference that are linked to paths other than two highest power paths comprising:
        generating an interference term resulting from the interference on said equalized symbols, of all paths of the transmission channel having an impulse response of the transmission channel except the two highest power paths, and
        subtracting said interference term from the symbols of the block of N received symbols, and
    a second equalization step that is equal to an at least one repetition of the first equalization step.

13. A non transitory storage medium that is readable by a processor, on which a program is recorded comprising instructions for the execution of a method for equalizing a signal comprising a plurality of modulated symbols, said signal being transmitted by a sender, through a transmission channel, to a receiver, said method comprising the following steps that are applied to a block of N received symbols, N being a non-zero positive integer:
    a first equalization step for said block comprising:
        demultiplexing the N received symbols by a factor L to generate a predetermined L number of sub-blocks of symbols, each having a version said block of N received symbols that is sub-sampled by a factor L, L being a non-zero positive integer,
        independently equalizing each sub-block of symbols using an identical equalization algorithm, and
        multiplexing the respective equalized symbols of said each sub-block to obtain a block of N equalized symbols,
    a step of removing instances of interference that are linked to paths other than two highest power paths comprising:
        generating an interference term resulting from the interference on said equalized symbols, of all paths of the transmission channel having an impulse response of the transmission channel except the two highest power paths, and
        subtracting said interference term from the symbols of the block of N received symbols, and
    a second equalization step that is equal to an at least one repetition of the first equalization step.

14. A system for equalizing a received signal, comprising:
a receiver including means for equalizing a signal, comprising a plurality of modulated symbols, said signal being transmitted by a sender, through a transmission channel, to the receiver, the receiver configured to perform the following steps applied to a block of N received symbols, N being a non-zero positive integer:
a first equalization step for said block comprising:
  demultiplexing the N received symbols by a factor L to generate a predetermined L number of sub-blocks of symbols, each having a version of said block of N received symbols that is sub-sampled by a factor L, L being a non-zero positive interest,
  independently equalizing each sub-block of symbols using an identical equalization algorithm, and
  multiplexing the respective equalized symbols of said each sub-block to obtain a block of N equalized symbols,
a step of removing instances of interference that are linked to paths other than two highest power paths comprising:
  generating an interference term resulting from the interference on said equalized symbols, of all paths of the transmission channel having an impulse response of the transmission channel except the two highest power paths, and
  subtracting said interference term from the symbols of the block of N received symbols, and
a second equalization step that is equal to an at least one repetition of the first equalization step.

* * * * *